July 20, 1965 E. P. STABLER 3,196,414

MAGNETIC CORE LOGIC CIRCUITS EMPLOYING COUPLED SINGLE PATH CORE STRUCTURES

Filed March 2, 1960

4 Sheets-Sheet 1

INVENTOR:
EDWARD P. STABLER,
BY Marvin A. Goldenberg
HIS ATTORNEY.

July 20, 1965

E. P. STABLER 3,196,414

MAGNETIC CORE LOGIC CIRCUITS EMPLOYING COUPLED SINGLE PATH CORE STRUCTURES

Filed March 2, 1960

4 Sheets-Sheet 2

INVENTOR:
EDWARD P. STABLER,
BY Marvin A. Goldenberg
HIS ATTORNEY.

July 20, 1965

E. P. STABLER 3,196,414

MAGNETIC CORE LOGIC CIRCUITS EMPLOYING COUPLED SINGLE PATH CORE STRUCTURES

Filed March 2, 1960

4 Sheets-Sheet 3

INVENTOR:
EDWARD P. STABLER,
BY Marvin D. Goldenberg
HIS ATTORNEY.

July 20, 1965 E. P. STABLER 3,196,414

MAGNETIC CORE LOGIC CIRCUITS EMPLOYING COUPLED SINGLE PATH CORE STRUCTURES

Filed March 2, 1960

4 Sheets-Sheet 4

INVENTOR:
EDWARD P. STABLER,
BY Marvin A. Goldenberg
HIS ATTORNEY.

United States Patent Office 3,196,414
Patented July 20, 1965

3,196,414

MAGNETIC CORE LOGIC CIRCUITS EMPLOYING COUPLED SINGLE PATH CORE STRUCTURES

Edward P. Stabler, North Syracuse, N.Y., assignor to General Electric Company, a corporation of New York Filed Mar. 2, 1960, Ser. No. 12,335
2 Claims. (Cl. 340—174)

The invention relates to novel magnetic core logic circuits employing coupled single path core structures. More particularly the invention relates to novel magnetic core logic circuits for performing numerous logical functions which employ toroids coupled together simply by short circuited closed loops. The invention provides arrangements performing logic functions without requiring the more conventional core coupling elements such as diodes and the like.

In the prior art numerous multipath magnetic structures of a unitary construction have been devised for performing various logical operations, such as AND gates, OR gates, odd parity checkers, half-adders, and other logical operations combining gating and storage functions. Some of these prior art logic circuits are disclosed in an article by H. W. Abbott and J. J. Suran entitled "Multihole Ferrite Core Configurations and Applications," appearing in the Proceedings of the IRE, August 1957, and in an article by N. F. Lockhart entitled, "Logic by Ordered Flux Changes in Multipath Ferrite Cores," appearing in the 1958 IRE National Convention Record, part 4. Magnetic core logic circuits in general exhibit a number of advantages over conventional active element logic circuits. They are economical to construct, requiring fewer components and being capable of mass production techniques, are rugged and reliable, and they consume a small amount of power. Magnetic core logic has certain advantages over conventional construction techniques for multipath core structures in that the configurations may occur in more than single planes, and in that uniformity in individual magnetic flux paths is more easily achieved. As a result, the structure is often deformed in achieving the planar geometry.

Applicant's novel single path coupled core structures, in addition to retaining many of the above advantages of multipath core construction, obviate many of the limitations. They may employ single core constructions typically simple toroids and therefore are easily fabricated. The problem of achieving critical dimensions required at flux modes in multipath core devices is not present since the nodes are replaced by short circuited loops. The single path cores are, therefore, easier to miniaturize and require less power consumption. In addition, the leakage flux is considerably less in the coupled toroid devices than in many of the multipath magnetic core structures. Applicant uses the term single path to define an unbranched flux loop.

Although the prior art discloses magnetic logic devices employing coupled toroids, the coupling circuitry normally requires additional elements such as diodes and/or resistors. For a disclosure of some of these devices see L. A. Russell's article entitled, "Diodeless Magnetic Core Logical Circuits," in the 1957 IRE National Convention Record. The requirement of these additional coupling elements has proven to be a considerable limitation for many logical operations. Applicant has devised networks requiring simple toroids coupled together entirely by shorted wire loops, without any additional coupling elements, for performing numerous intricate logical functions.

Applicant has discovered that an equivalent structure consisting entirely of a plurality of simply wound toroids coupled together by short circuited loops of wire can be constructed for every given multipath core network. This is accomplished by considering the given multipath core network as composed of many simple magnetic elements, or building blocks, which may be in the form of a bar whose length is considerably larger than the other dimensions. Across these building blocks exists a useful relationship between the magnetomotive force, M, and the flux density, B, which relationship may be analogized to a current carrying nonlinear electric circuit. Thus, the usual Kirchhoff constraints may be applied to these multipath core magnetic networks. These constraints are: (1) the total flux entering a node is always equal to zero, and (2) the sum of the magnetomotive forces around any closed-path is equal to zero.

The elementary building block for a coupled single path core network consists of a simply wound closed single path core structure, such as a toroid. For such structure a relationship exists between the current applied to the winding and the flux change in the toroid, which is analogous to the relationship of the magnetomotive force to flux density existing for the building block of the multipath core structure. Thus, the respective building blocks are identically related. The toroids may be coupled together in such a manner as to preserve this relationship, thereby forming a structure equivalent to a given multipath magnetic network. This is accomplished by employing short circuited closed loops for coupling the various toroidal building blocks. The shorted loops are then analogous to the nodes of a multipath structure in that the voltages existing in a shorted loop are derived from applied flux changes in a first core and in turn induce flux changes in the cores linked in the loop. In the idealized case, the sum of these voltages will equal zero, and, neglecting the constant of integration, the sum of the time integrated voltages will equal zero. This corresponds to the requirement that the total flux entering a node in the multipath case is equal to zero. Thus, the shorted loop construction imposes essentially the same constraint on the integrated voltages as a node imposes on the flux. The shorted loop also may readily be shown to force the second Kirchhoff constraint to be satisfied.

It is an object of the invention to provide novel magnetic core logic circuits employing shorted loop coupled single path core structures.

It is a further object of the invention to provide a novel magnetic core logic circuit employing coupled single path core structures useful as a multiple input AND gate.

It is another object of the invention to provide a novel magnetic core logic circuit employing coupled single path core structures combining the functions of both an AND gate and an OR gate.

Briefly, in accordance with one aspect of the invention there is provided a signal translating device comprising a first and second plurality of toroids interconnected by a short circuited loop, providing multiple input AND gate operation. Said toroids are constructed of a magnetic material exhibiting remanence and having a low permeability at saturation. Reset means are provided for orienting the flux in the toroids of said first plurality in one direction and the toroids of said second plurality in a direction opposite to said one direction. Each of the toroids of said first plurality and one of the toroids of said second plurality are of equal diameter, the remaining toroids of said second plurality being of successively larger diameters. Input signals are coupled to the toroids of said first plurality which reverse the flux therein and also cause a flux reversal in the toroids of said second plurality. Each switching of one input toroid is accompanied by the switching of one output toroid. Thus, a response is provided in output windings coupled to the toroids of said second plurality in accordance with the number of input signals applied.

Although the features of the invention which are believed to be novel are set forth with particularity in the appended claims, the invention itself both as to its organization and method of operation, together with further objects and advantages thereof, may best be understood by reference to the following description taken in connection with the accompanying drawings wherein:

Figure 1:
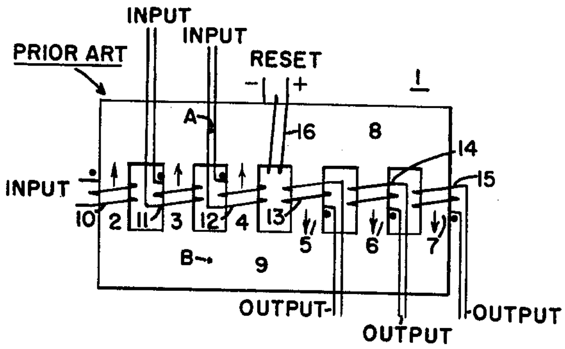
FIGURE 1 is a schematic diagram of a known multipath magnetic core device performing both AND and OR logic functions.

Referring now to FIGURE 1, there is shown a known multipath magnetic core logic device which is capable of performing a number of binary logical functions. The magnetic state of the multipath core is made to respond in a predictable way to either the number or combination of inputs applied to it. The circuit illustrated is fully disclosed in the previously referred to Lockhart article and is presented here merely to facilitate the understanding of applicant's novel coupled single path core devices. Thus, considering FIGURE 1, the magnetic core 1 is shown to have six vertical flux paths or legs 2 to 7, each of identical cross sectional area, including three input legs 2 to 4 and three output legs 5 to 7. Two horizontal flux paths 8 and 9 connect the input and output legs. The horizontal legs 8 and 9 each have a cross sectional area of at least three times the cross sectional area of each vertical leg so that each input leg may be coupled by a flux path to a corresponding output leg simultaneously. Thus flux may flow between legs 2 and 5, 3 and 6, and 4 and 7. Input windings 10, 11 and 12 are wound about the vertical input legs 2, 3 and 4 respectively and output windings 13, 14 and 15 are wound about the three output legs 5, 6 and 7 respectively. A reset winding 16 is wound about the upper horizontal leg 8. The reset pulse applied to reset winding 16 must be of sufficient amplitude and duration to saturate each of the three flux paths coupling the input and output legs. The input pulses applied to the input windings 10 to 12 must be of sufficient amplitude and duration to cause complete reversal of the saturation magnetization of the flux paths associated with these windings.

Figure 3:
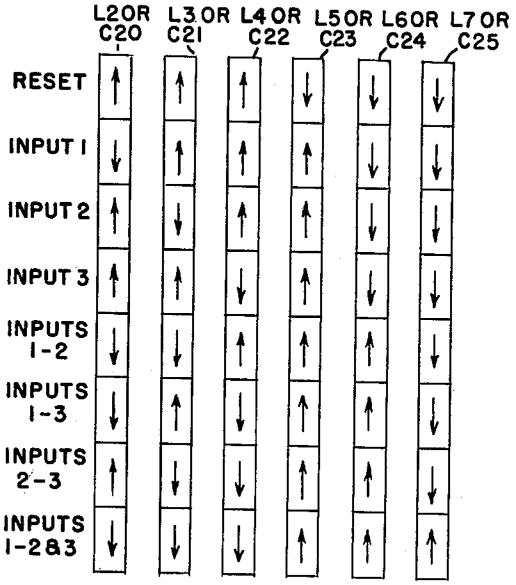
FIGURE 3 is a graphical representation of the flux patterns occurring to the various flux paths of the devices of FIGURES 1 and 2.

In the operation of the device the reset pulse is applied after every information sequence in a direction as to force flux in a clockwise direction and saturate the input legs 2 to 4 with flux flowing upward and the output legs 5 to 7 with flux flowing downward, as indicated in FIGURES 1 and 3. By applying an input to input winding 10 in the direction indicated by the dot, the flux in the path linking input leg 2 and output leg 5 will reverse and an output pulse will be obtained from output winding 13. By applying an input pulse to either of input windings 11 or 12 a flux reversal will take place in the path coupling output leg 5 and the respective input leg being pulsed, providing an output in winding 13. The resulting flux patterns in core 1 are illustrated in FIGURE 3. An input applied simultaneously to each of input windings 10 and 11 will reverse the flux in legs 2, 3, 5 and 6 providing a response from both output windings 13 and 14. Similarly, an input applied simultaneously to any two of the three input windings will reverse the flux in output legs 5 and 6 and the respective two input legs being pulsed, and will provide an output from windings 13 and 14. In order to provide an output in output winding 15, all three of the input windings 10 to 12 must be pulsed simultaneously. This has the effect of reversing the flux in each of the vertical legs and providing an output from windings 13, 14 and 15. The flux patterns for these input combinations are illustrated in FIGURE 3. It may be seen that the output obtained from winding 13 is an inclusive OR function, being responsive to any one input or to more than one input. Correspondingly, the output obtained from winding 14 is indicative of any two out of three or three out of three inputs, and the output provided by output winding 15 is an AND function responsive only to all three inputs.

Figure 2:
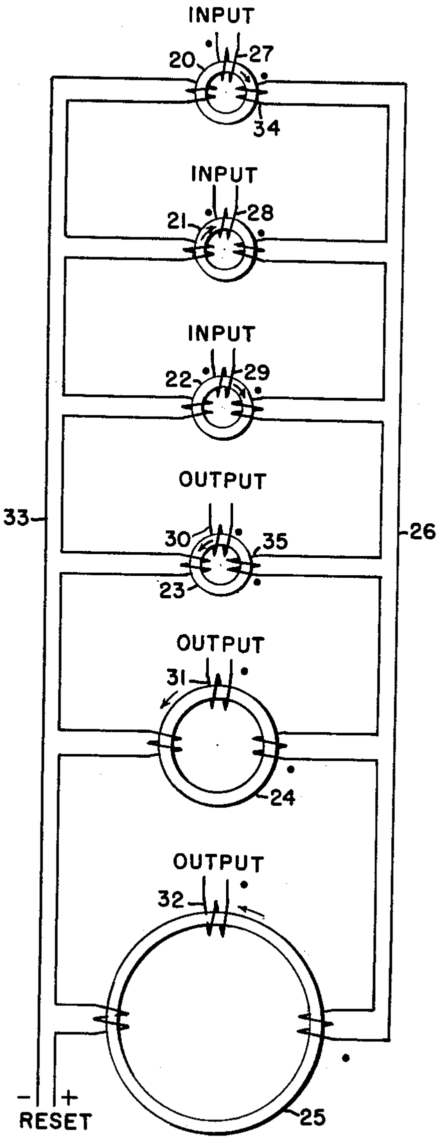
FIGURE 2 is a schematic diagram of a novel coupled single path core device performing the same logic functions as the device of FIGURE 1.

The coupled core structure of FIGURE 2 can be derived from the device of FIGURE 1 by first dividing said device into a number of building block elements consistent with its operation. This can be done, requiring a minimum of elements, by assuming a node to exist at points A and B in FIGURE 1. Thus, six elements, each including one of the vertical legs 2 to 7, are coupled between the nodes A and B. Considering node A, by the application of Kirchhoff's law, the sum of the flux entering the node must equal zero. Now we employ one toroid for each of said building block elements, each having a cross sectional area equal to that of said elements, and couple them together by a single shorted loop. The number of turns of the shorted loop winding may be selected on the basis of desirable circulating current levels or other grounds, e.g., providing flux gain, but for explanation, all winding turns will be considered to be equal. If drive windings are placed on the toroids corresponding to the drive elements of the multipath core device of FIGURE 1, the sum of the voltages induced in the loop by each of the toroids in response to the driving force will equal zero. This corresponds to forcing the coupled single path core device of FIGURE 2 to obey the same nodal constraints as exist in the multipath core device of FIGURE 1. The second Kirchhoff constraint of the magnetomotive forces around any closed-path being equal to zero is then also satisfied. The flux path and hence the diameter of each core is determined so that flux flowing into the various cores corresponds to the flux flowing in the building block elements of the multipath core network. The terms "flux flow" are used for descriptive purpose and actually mean a flux reversal along a given path. Hence, the network of FIGURE 2 is made equivalent to and can perform the same logic as the network of FIGURE 1.

Referring now to FIGURE 2, the circuit consists of six simple annular cores or toroids 20 through 25 of identical cross sectional area, which each provides a single flux path, coupled together by a short circuited loop 26. The cores are preferably constructed of a ferrite material, as are the cores in all of applicant's configurations, exhibiting a substantially square loop hysteresis characteristic, although other magnetic material exhibiting remanence and having a low permeability at saturation can be employed. Cores 20 through 23 have the same diameter and thus flux paths of identical length. Core 24 has a diameter approximately three times the diameter of cores 20 through 23. Core 25 has a diameter approximately three times that of core 24. Thus, selective switching between cores is provided, as will be presently understood. Input windings 27, 28 and 29 are wound about cores 20, 21 and 22 respectively, and output windings 30, 31 and 32 are wound about cores 23, 24 and 25 respectively. Winding 30 responds to the application of one or more inputs. Winding 31 responds to two or more inputs and winding 32 responds only to the application of all three inputs. Reset winding 33 is wound about all six cores and drives the core flux in the direction shown in FIGURES 2 and 3. In the graph of FIGURE 3, the arrows in the upward direction represent a clockwise flux and the downward directed arrows represent a counterclockwise flux.

In the operation of the circuit of FIGURE 2 a reset pulse is applied by winding 33 which saturates each of the cores 20 to 22 in the clockwise direction and each of the cores 23 to 25 in the counterclockwise direction. Input pulses of an amplitude and duration to provide rapid flux reversals in the cores are selectively applied to input windings 27 to 29 in the direction indicated by the dots so as to produce a flux in a counterclockwise direction in the input cores 20 to 22. Assuming an input pulse is applied to input winding 27, the flux in core 20 will reverse. The reversal of the flux in core 20 will induce a voltage in the secondary winding 34 of the shorted loop which drives current in the short circuited loop 26 in a direction to switch the flux in core 23, providing an output in winding 32. The driven current is in a direction to further saturate cores 21 and 22. Cores 24 and 25 do not switch because the switching of core 23 limits the current flowing in the shorted loop 26 to a value less than is required to coerce a flux change in the two larger cores. Thus, the induced voltage in winding 34 of core 20 is opposed by an equal and opposite voltage induced in the winding 35 of core 23. An input applied to either of the windings 28 and 29, which reverses the flux in the associated toroids 21 and 22, will also provide an output indication in winding 30.

Assuming an input pulse is simultaneously applied to each of windings 27 and 28, the flux in both cores 20 and 21 will reverse and a current will flow in the short circuited loop 26 which first switches the flux in core 23 and then switches the flux in core 24. Thus, an output is obtained from both output windings 30 and 31. Similarly, by simultaneously applying an input to any two of the three input windings 27, 28 and 29, an output is obtained from windings 30 and 31. When an input is simultaneously applied to each of the three input windings 27, 28 and 29, the flux will reverse in cores 20 to 22 causing a current to flow in the short circuited loop 26 such as to reverse the flux in cores 23, 24 and 25. An output is thereby obtained from each of the output windings 30, 31 and 32. The flux patterns in the cores for each of the input conditions is illustrated in FIGURE 3. Thus, it may be seen that the output from winding 30 is an inclusive OR function being responsive to one or more inputs. The output from winding 31 is responsive to inputs supplied to two out of three input windings or to three out of three input windings, and the output obtained from winding 32 is responsive to the application of three inputs and provides a multiple input AND function.

The number of logical operations that can be performed by the network of FIGURE 2 may be increased by placing additional input and output windings around cores 20 to 25 or by adding additional input and output cores. For example, by adding input windings to the input cores 20 to 22 another level OR function may be accomplished thereby providing a third order binary logic operation. By employing additional input and output cores the AND-OR logic functions described above can be readily extended. In an alternative arrangement, cores 24 and 25 can be replaced by a plurality of cores, serially connected, of the same diameter as the other cores but with proportionally fewer windings. The cores may also be of varying cross sectional area if the windings and diameter are accordingly adjusted. For example, a smaller cross sectional area core can be used for one with a fewer number of turns and a smaller diameter.

Figures 4, 5:
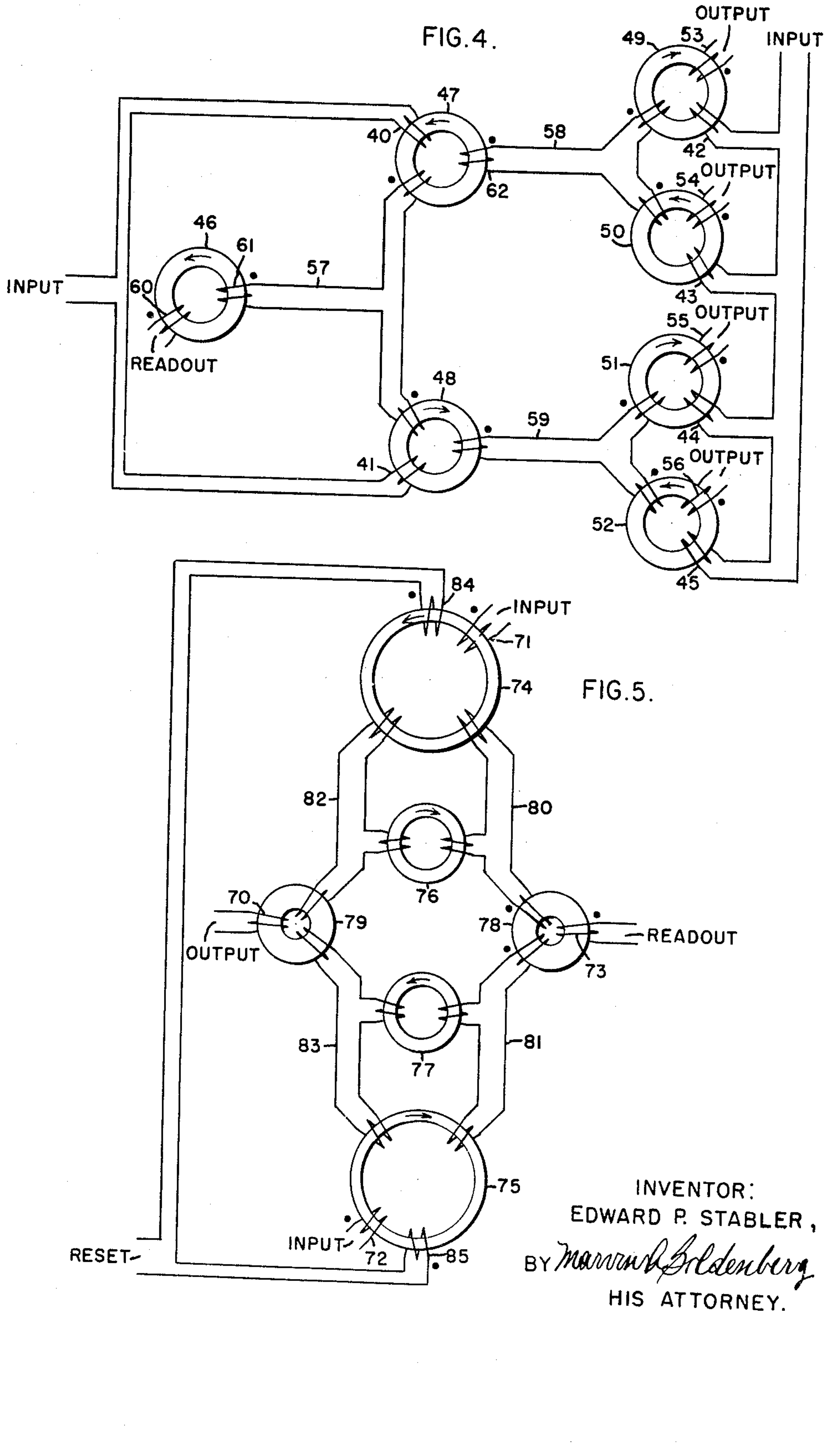
FIGURE 4 is a schematic diagram of a novel coupled single path core device which accepts two variable inputs and provides at disjointed outputs an indication of the possible combinations of the presence or absence of the respective inputs.
FIGURE 5 is a schematic diagram of a novel coupled single path core device exclusive OR gate.

Referring to FIGURE 4, there is illustrated a coupled single path magnetic core logic circuit having two variable binary inputs and four disjointed outputs. The circuit acts to steer flux changes through various paths to a selected output in accordance with the input information, much the same as a sequence of electrical switches steers current. Input pulses of a "1" or "0" value are applied to windings 40 and 41 of a first input stage and to windings 42 to 45 of a second input stage. The first input stage includes cores 47 and 48 and the second input stage includes cores 49 to 52. Core 46 is a readout core. The outputs are taken selectively from windings 53 to 56. Each of the output windings is responsive to a different combination of inputs. For example, with a "1" applied to each of the first and second input stages by input windings 40 to 45, an output will be obtained from winding 53. A "1" and a "0" applied to the first and second input stages, respectively, produce an output from winding 54. A "0" and a "1" produce an output at winding 55, and a "0" applied to each of the input stages provides an output at winding 56.

The seven cores 46 to 52 in the circuit of FIGURE 4 are preferably fabricated of a ferrite material having a substantially square loop hysteresis characteristic. They are each of the same diameter and cross sectional area. Core pair 47 and 48 of the first input stage are coupled to readout core 46 by short circuited closed loop 57. Cores 49 and 51 of the second input stage are coupled to core 47 by short circuited loop 58, and cores 52 and 53 are coupled to core 48 by short circuited loop 59. Input windings 40 and 41 of the first input stage are wound about cores 47 and 48, respectively, so as to drive flux in the two cores in opposing directions. Input windings 42 to 45 of the second input stage are wound about cores 49 to 52, respectively, so as to drive flux in the cores in alternately opposing directions. The stored input information is read out by a readout pulse which is applied to readout winding 60. The readout pulse induces an output voltage in a selective one of windings 42 through 45 in accordance with the applied input information.

In the operation of the circuit of FIGURE 4, a "1" is represented by a positive applied pulse which drives saturation flux in the upper cores 47, 49 and 51 of the core pairs in a counterclockwise direction and drives a saturation flux in the lower cores 48, 50 and 52 in a clockwise direction. A "0" is represented by a negative applied pulse which drives a saturation flux in said upper cores in a clockwise direction and drives a saturation flux in said lower cores in a counterclockwise direction. If a "1" is applied to the input windings of the first input stage and a "0" simultaneously applied to the input windings of the second input stage, the flux orientation of cores 47 through 52 is as shown in FIGURE 4. As an initial condition of operation, it is necessary that the flux in core 46 be saturated in a counterclockwise direction, as shown, to provide switching in response to a readout pulse from winding 60. Application of the readout pulse will reverse the flux in core 46 and induce a voltage in the associated winding 61 of shorted loop 57 which drives current in said loop in a direction to reverse the flux in core 47. Core 48 will be driven further into saturation. The switching of core 47 will induce a voltage in the associated winding 62 of shorted loop 58 which drives current in said loop in a direction such as to switch core 50 and drive core 49 further into saturation. Therefore, an output is obtained at winding 54. If now a "0" is applied to the first input stage and a "1" to the second input stage, the flux orientation of cores 47 to 52 will be opposite to the showing in FIGURE 4. The new input information causes the flux in core 46 to again assume a counterclockwise direction. Application of the readout pulse causes cores 46, 48 and 51 to switch and produces an output response at output winding 55. Correspondingly, a "1" input applied to each of the input stages results in the switching of cores 46, 47 and 49, and a "0" input applied to each of the input windings results in the switch of cores 48 and 52.

It is noted that it is necessary to apply the two input pulses simultaneously so that the cores of the first input stage will not interact with the cores of the second input stage during the application of the input signals. It is further noted that the readout core 46 and shorted loop 57 may be replaced by other means for driving flux in cores 47 and 48, e.g., by a pulse generator connected to windings wound on each of the cores.

Referring now to FIGURE 5 there is illustrated a coupled single path magnetic core exclusive OR gate. This circuit provides an output at winding 70 if one or the other of input windings 71 or 72 receives a pulsed input signal. A readout signal for the circuit is supplied to readout winding 73. The circuit comprises six coupled single path ferrite core structures, which include two input cores 74 and 75, two control cores 76 and 77, a readout core 78 and an output core 79. Cores 76 and 77 are of a first cross sectional area, and cores 74 and 75 have a cross sectional area at least equal to said first cross sectional area. Cores 78 and 79 have a substantially larger cross sectional area than cores 76 and 77. The diameter of cores 74 and 75 is approximately three times the diameter of cores 76 to 79 to establish selective flux switching among the cores. Short circuited loop 80 couples together cores 74, 76 and 78. Short circuited loop 81 couples cores 75, 77 and 78. Short circuited loop 82 couples cores 74, 76 and 79, and short circuited loop 83 couples cores 75, 77 and 79. Reset windings 84 and 85 are wound about cores 74 and 75, respectively, so as to drive the flux in these cores in opposite direction. Application of a pulse to reset windings 84 and 85 drives the flux in control cores 76 and 77 in opposite directions and prevents an output from apperaing at winding 70 in response to a readout pulse applied to winding 73. Input windings 71 and 72 are wound about cores 74 and 75, respectively, to drive flux in a reverse direction to that of said rest windings . Readout winding 73 is wound about core 78, and output winding 70 is wound about core 79.

In the operation of the circuit of FIGURE 5, it will be assumed that the initial flux state of cores 78 and 79 is in an unsaturated state. These cores never saturate in the circuit operation because of their relatively large cross sectional dimension. It is further assumed, for purposes of explanation, that the flux in core 74 is saturated in a counterclockwise direction, that the flux in core 75 is saturated and in a clockwise direction. However, these cores may have a sufficiently large cross section so that they would not saturate. The flux in core 76 is in a clockwise direction, and the flux in core 77 is in a counterclockwise direction. Cores 76 and 77 must be in a saturated state for proper circuit operation, as will be seen. This initial flux condition may be readily set up by means external to the circuit and once set up there is required no further flux orientation other than what takes place during the normal operation of the circuit. With the cores 74 to 79 in the initial flux state, the application of a readout signal to the dotted terminal of winding 73, which consists of an alternating positive and negative pluse, provides no output at winding 70. The amplitude and duration of the readout pulse is sufficient to fully reverse the flux in both of the small cores 76 and 77 but not great enough to change the flux in either of the two large cores. By considering the flux patterns illustrated in FIGURE 5, it may be seen that the positive portion of the readout is prevented from being transmitted to the output winding 70 by core 74, the flux in core 76 being driven further into saturation, and the negative portion of the readout is blocked by core 75, core 77 being driven further into saturation. Hence, no switching can take place in any of the cores in response to the readout signal.

Now consider an input applied to input winding 71. This switches both cores 74 and 76. With this input applied, the positive pulse of the readout signal will reverse the flux in both cores 76 and 77, which in turn causes a flux change in core 79 and yields an output at winding 70. The negative succeeding portion of the readout signal will again reverse cores 76 and 77. A reset pulse subsequently applied to winding 84 serves to switch cores 74 and 76, and the circuit is again in the initial blocked condition. It may readily be seen that if an input is applied to winding 72, the circuit is again unblocked being responsive to the negative pulse of the readout signal. If simultaneous inputs are applied to windings 71 and 72 both cores 76 and 77 switch and the circuit remains blocked. Thus, a logical exclusive OR operation is performed.

Figure 6:
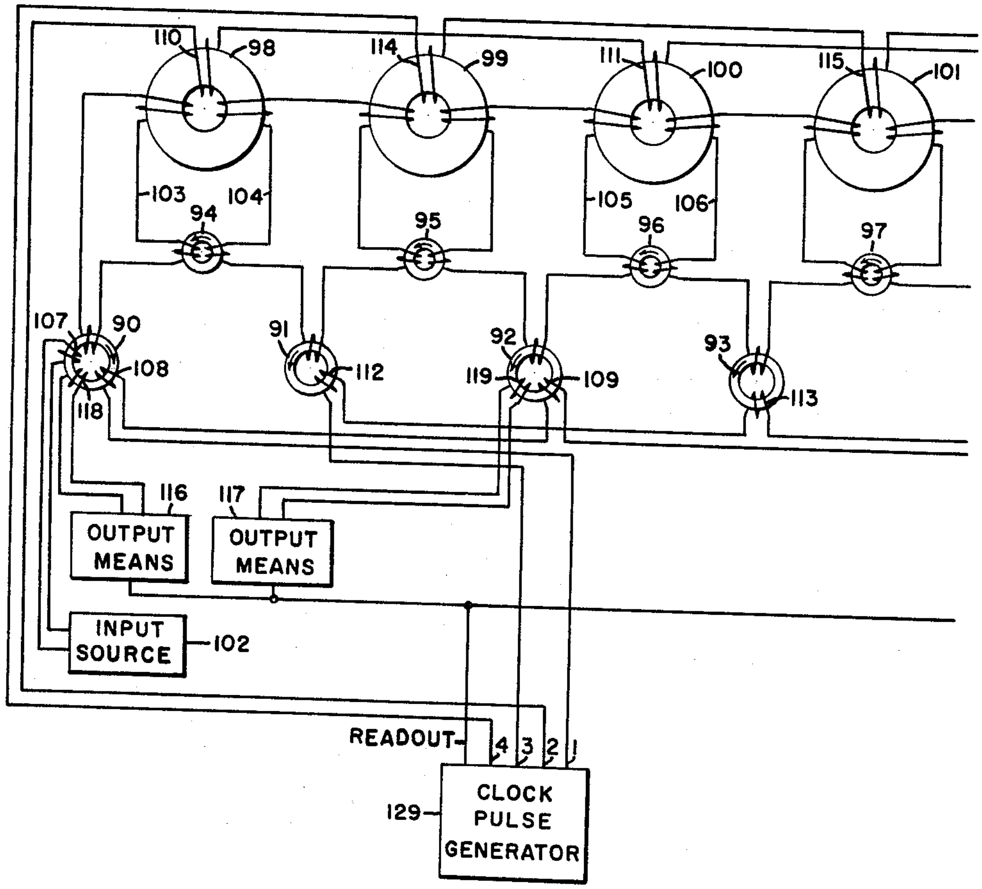
FIGURE 6 is a schematic diagram of a first embodiment of a novel coupled single path core device which performs as a shift register.

Referring now to FIGURE 6 there is illustrated a coupled single path magnetic core logic network which is constructed so as to form a shift register. The register comprises *n* number of alternating information and ready cores including 90, 91, 92 and 93, respectively, said cores being coupled together by diode cores 94, 95, 96 and 97, which allow flux coupling in one direction only in accordance with its flux orientation. Associated with each diode core is a reset core, including reset cores 98, 99, 100 and 101 which are coupled to the above recited diode cores. The shift register normally receives a train of binary information at the extreme left-hand information core 90 from input source 102 and shifts the information to the right. The stored information can be read out sequentially from any one of the information cores, including cores 90 and 92 by associated output means, or it can be read out in parallel from said information cores in a simultaneous manner.

Each information and ready core is of similar construction, having a diameter approximately one and a half times the diameter of the diode cores, which are all of equal diameter. The cross sectional areas of the three cores are the same. The reset cores have a substantially larger diameter and cross sectional area than the other cores, by a factor of 10 or more. All of the cores are constructed of a ferrite material, preferably. The described core dimensions allow proper switching to take place in the cores so as to shift the information along the register, as will be presently explained.

The information core 90 and ready core 91 are coupled to the diode core 94 and the reset core 98 by short circuited loops 103 and 104. Short circuited loop 104 also couples ready core 91, diode core 94 and reset core 98 to diode core 95 and reset core 99. Information and ready cores 92 and 93 are coupled to diode core 96 and reset core 100 by short circuited loops 105 and 106. Shore circuited loop 105 also couples to diode core 95 and reset core 99, and short circuited loop 106 also couples to diode core 97 and reset core 101. Diode core 97 couples ready core 93 to the succeeding information element.

Figure 7:
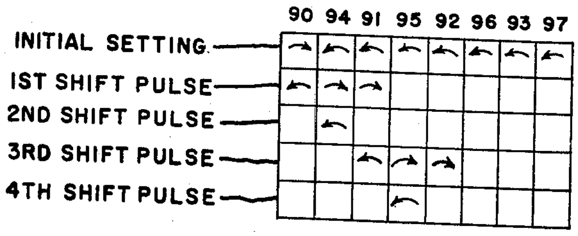
FIGURE 7 is a graphical representation of the flux patterns occurring in the various flux paths of the shift register of FIGURE 6.

Binary input information of a "1" or "0" is normally supplied to the first information core, or element, 90 by input source 102 which is coupled to core 90 by input winding 107. The input applied by input winding 107 will orient the flux in information core 90 in a direction indicative of the input information. In the instance where it is desirable for an input to be applied to an intermediate information core, it is necessary for the input winding to also be wound on the preceding diode core in a direction to drive it further into saturation. A "1" input is represented by a saturation flux in the clockwise direction in the information and ready cores, or elements, and a "0" is represented by a counterclockwise flux in these cores. When an input is applied to the first information core 90, a "1" or "0" is also being stored in each information core of the register. As illustrated in FIGURE 6, a "0" is stored in information core 92. Thus, at a time immediately subsequent to the feeding in of information to the first information core 90 all of the information bits in the register are stored in the information cores and the ready cores are all in the ready to receive condition, which is equivalent to a "0," as shown by ready cores 91 and 93. The flux orientation of the saturated cores 90 to 97 is as illustrated in FIGURES 6 and 7.

The information is shifted to the right to the succeeding ready elements under the influences of a first sequence of two successive positive shift pulses supplied by a four phase clock pulse generator and timer 129. The first shift pulse is applied to the information cores being applied by windings 108 and 109 to cores 90 and 92, respectively. The application of this shift pulse will switch the flux in information core 90, diode core 94, and ready core 91, as illustrated in FIGURE 7. It is noted that in FIGURE 7 only flux changes effected by the shift pulses are indicated. The cores not indicated by a flux arrow in the shift pulse rows remain in their previous state. Diode core 95 will not switch because it is loaded and requires a greater coercive force to switch than does ready core 91. Winding 109 effects no switching because core 92 is driven further into saturation. The second shift pulse is applied to the reset cores to the right of the information cores, being applied by windings 110 and 111 to cores 98 and 100, respectively, and will switch the flux in the diode core 94 back to the initial direction. Core 96 is driven further into saturation. The amplitude and duration of the second shift pulse is limited so as to be capable of driving only the diode cores but not the information or ready cores. Since the reset cores are of large cross sectional area, they may be pulsed in the same direction to reset their associated diode cores many times before they become saturated, at which time they require resetting. Thus, the information which was initially in the information core 90 is shifted into ready core 91. The information initially in information core 92 is effectively shifted into ready core 93, although since it was in the "0" state, it may be seen no actual shift was effected. It is noted that a similar shift has taken place between all information and ready elements of the shift register.

Under a second sequence of two successive positive shift pulses, identical to the first two, the information is further shifted to the right into the succeeding information cores so that one complete shifting cycle from information element to information element is accomplished. The third shift pulse is applied to the ready cores being applied by windings 112 and 113 to cores 91 and 93, respectively. This will switch cores 91, 95 and 92, shown in FIGURE 7. Diode core 94 will not switch because it is driven further into saturation. Diode 96 will not switch, for reasons explained previously. Ready core 93 is driven further into saturation. The third shift pulse of the second pulse sequence also gates a new information bit into the first information core 90 from input source 102. A fourth shift pulse is applied to the coupling reset cores to the right of the ready cores, being applied by windings 114 and 115 to cores 99 and 101, respectively, and will switch diode core 95. The information cores are each coupled to associated output means, output means 116 and 117 receiving output information from cores 90 and 92, respectively. Output means 116 and 117, including windings 118 and 119 which are wound about the information cores 90 and 92, respectively, sense the flux change in cores 90 and 92. The pulse generator and timer 129 is coupled to each of the output means and provides the taking of an output after the fourth shift pulse. Each of the output means may be controlled to read out simultaneously or the readout may be taken from only a single output means. The readout may be of the destructive or non-destructive type, well known in the art.

Figures 8, 9:
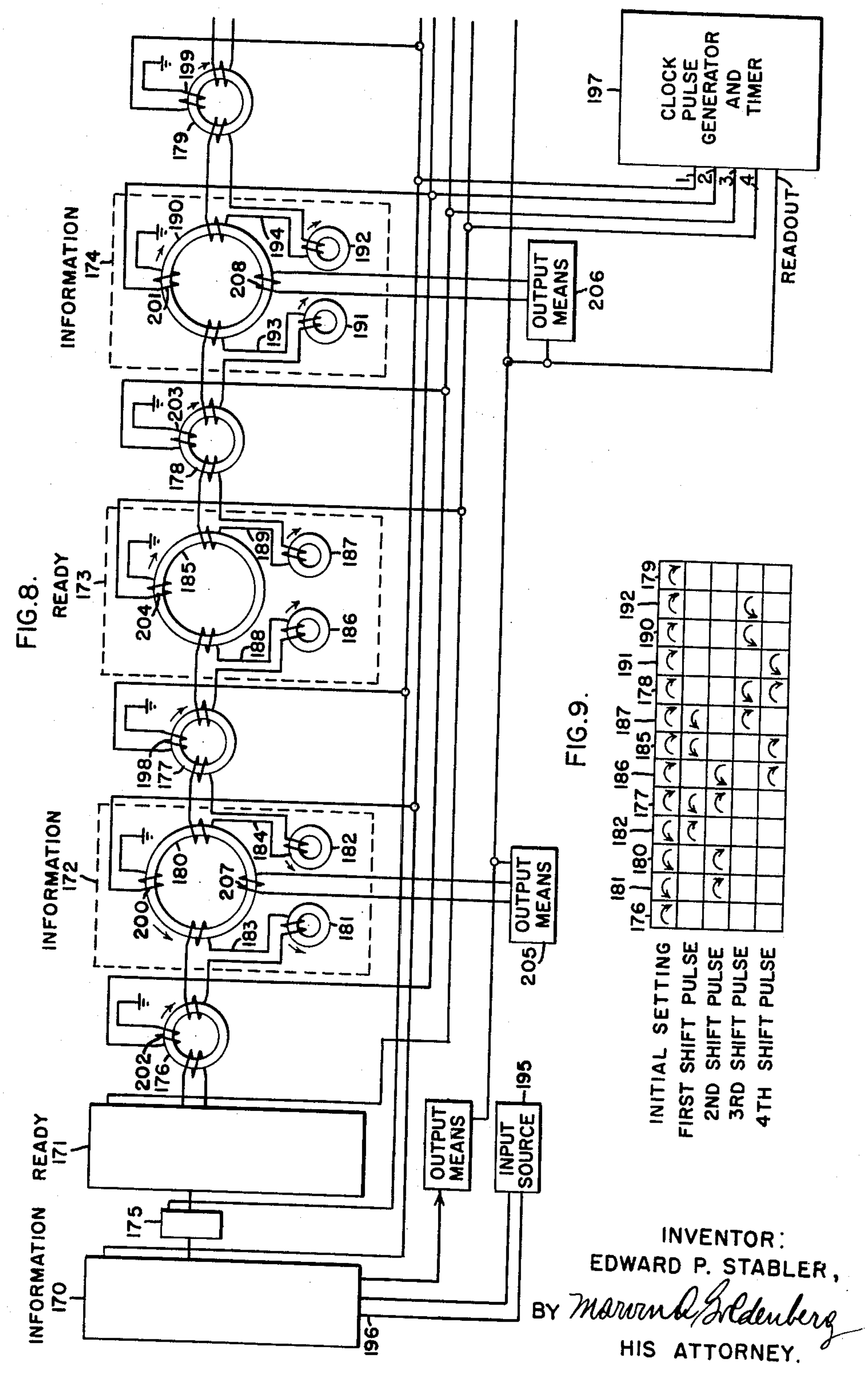
FIGURE 8 is a schematic diagram of a second embodiment of a novel coupled single path core device which performs as a shift register.
FIGURE 9 is a graphical representation of the flux patterns occurring in the various flux paths of the shift register of FIGURE 8.

Referring now to FIGURE 8 there is illustrated another embodiment of a coupled single path magnetic core shift register. As in the circuit of FIGURE 6 the $n$ number of information and ready elements, including 170, 171, 172, 173 and 174, are in alternating positions, and are connected together by coupling cores 175 to 179. In the instant circuit each information and ready element comprises a large diameter core and two identical small diameter cores, shown as cores 180, 181 and 182, respectively, in element 172, which is the first detailed information element. The diameter of the large core 180 is approximately three times that of the small cores 181 and 182, which allows selective switching among the cores. The cross sectional areas of the three cores are equal. Coupling cores 175 to 179 have the same cross sectional area as the other cores and a diameter one and one half times that of the small cores.

In element 172, large core 180 and small core 181 are coupled together by short circuited loop 183 which also couples to coupling core 176. Large core 180, small core 182 and coupling core 177 are coupled together by short circuited loop 184. Coupling core 176 provides coupling between the first detailed information element 172 and the preceding ready element 171. Coupling core 177 couples information element 172 to the first detailed ready element 173. Ready element 173 comprises large core 185 and small cores 186 and 187. Large core 185 is coupled to small core 186 and coupling core 177 by short circuited loop 188, and is coupled to small core 187 and coupling core 178 by short circuited loop 189. Coupling core 178 couples ready element 173 to the second detailed information element 174. Element 174 comprises large core 190 and small cores 191 and 192. Large core 190 is coupled to small core 191 and coupling core 178 by short circuited loop 193, and is coupled to small core 192 and coupling core 179 by short circuited loop 194. Coupling core 179 couples information element 174 to the next succeeding ready element.

Binary input information of a "1" or a "0" is supplied to the first information element 170 by input source 195 including input winding 196 which is wound around the large core, not shown, of said element. The input will switch all three cores of element 170 in a direction indicative of the information. A "1" is represented by a saturation flux in the counterclockwise direction in each of the three cores, and a "0" by a flux in the clockwise direction. When an input is applied to the first information element 170, a "1" or a "0" is also being stored in the three cores of each of the information elements of the shift register. As indicated in FIGURE 8, a "1" is stored in information element 172 and a "0" is stored in information element 174. At this time, immediately subsequent to the feeding in of information to the first information element 170, all of the information bits in the register will be stored in the information elements and the ready elements will all be in the ready to receive condition, which is equivalent to a "0" as shown by ready element 173. The coupling cores will have a flux in the clockwise direction, as indicated for cores 176, 177, 178 and 179. The initial flux orientation of the various cores is illustrated in FIGURE 9.

The information is shifted to the right to the succeeding ready elements under the influence of a first sequence of two successive positive shift pulses supplied by four phase clock pulse generator and timer 197. The first shift pulse is limited in an amplitude and duration so as to be sufficient to switch one large core but not two large cores. It is applied to alternate coupling cores which are situated to the right of the information elements. Thus, the application of this shift pulse by windings 198 and 199 to cores 177 and 179, respectively, will switch the flux in cores 182, 177, 185 and 187, as illustrated in FIGURE 9. Core 180 will not switch since it is effectively blocked by the switching of small core 182. In addition, the flux of core 180 is in a direction such as to be driven further into saturation. Core 190 will not switch because the drive applied by winding 199 is insufficient to switch it as well as the large core of the succeeding information element. Core 186 will not switch because it is also driven further into saturation.

The second shift pulse, which is limited in amplitude and duration similar to the first shift pulse, is applied to each of the large cores of the information elements. Thus, this pulse is applied by windings 200 and 201 to cores 180 and 190 in a direction that will cause switching in the cores 181, 180, 177 and 186, as illustrated in FIGURE 9. Core 182 is driven further into saturation. Core 185 is prevented from switching by the switching of small core 186. Core 190 is driven further into saturation. Thus, it may be seen that after the application of the first two shift pulses, the information which was initially in the information element 172 is shifted into ready element 173. The information initially in information element 174 is effectively shifted to the succeeding ready element, but since it was in the "0" condition no actual switching was effected. It may be appreciated that a similar shift has taken place throughout all the elements of the shift register and all information elements are now in the "0" condition and the ready elements in various information conditions.

By the application of a second sequence of two successive positive shift pulses, identical to the first two, the information is shifted further to the right into the succeeding information elements so that one complete shift cycle from information element to information element is accomplished. Thus, the third shift pulse is applied by windings 202 and 203 to coupling cores 176 and 178, respectively, and the fourth shift pulse is applied by winding 204 to core 185. The flux reversals taking place in the cores associated with the elements 173 and 174 are comparable to those previously described, and are indicated in FIGURE 9. The third shift pulse also gates a new information bit into the first information element 170 from input source 195.

The information elements are each coupled to an output means, output means 205 and 206 being provided to receive output information from elements 172 and 174, respectively. Output means 205 and 206 include windings 207 and 208 which are wound about large cores 180 and 190, respectively, for sensing the flux changes in elements 172 and 174. The clock pulse timer 197 is coupled to each of the output means and provides the taking of an output after the second pulse of the second pulse sequence. Each of the output means may be made to readout simultaneously or readout may be taken from only a single output means. In a destructive type of readout, the information element will be set to a "0" state after readout. Non-destructive readout techniques, well known in the art, may also be employed if desired.

It may be appreciated that numerous modifications may be made to the circuits which are within applicant's teaching. For example, although the various windings have all been described as having an equal number of turns, to simplify the operation, it often is desirable to resort to a flux gain which aids in compensating for circuit losses. Flux gain is accomplished by adding a few turns to some of the secondary windings. In addition, although toroids have been described, differently shaped single path cores may also be employed.

In addition, the shift register operation of FIGURES 6 and 8 may readily be reversed so that the information signals are translated from right to left. This is done by reversing the polarity and the order of the shift pulses. The appended claims are intended to be construed as including the above as well as all modifications which fall within the true scope of the invention.

What I claim as new and desire to secure by Letters Patent of the United States is:

1. A signal translating device comprising a first and second plurality of single closed path magnetic structures serially interconnected by a short circuited loop, means for orienting the flux in each of said first plurality of structures in one direction and for orienting the flux in each of said second plurality of structures in an opposite direction, information means coupled to said first plurality of structures applying an input signal thereto for selectively switching the flux in said first plurality of structures and thereby generating a current in said short circuited loop having a magnitude that is a function of said input signal, said second plurality of structures having a construction of discretely different magnitude coercive force requirements for reversing the flux therein in response to flux changes within said first plurality of structures, whereby application of said input signal providing a flux change in at least one of said first plurality of structures produces a flux change in a corresponding number of said second plurality of structures, and output means coupled to said second plurality of structures for providing a response indicative of said input signal.

2. A signal translating device as in claim 1 wherein said second plurality of magnetic structures have each different path lengths.

References Cited by the Examiner

UNITED STATES PATENTS

| | | | |
|---|---|---|---|
| 2,805,408 | 9/57 | Hamilton | 340—174 |
| 2,889,543 | 6/59 | Bloch | 340—174 |
| 2,904,779 | 9/59 | Russell | 340—174 |
| 2,910,595 | 10/59 | Russell | 307—88 |
| 2,922,996 | 1/60 | Young | 307—88 |
| 2,935,738 | 5/60 | Richards | 340—174 |
| 2,953,774 | 9/60 | Slutz | 340—174 |

IRVING L. SRAGOW, *Primary Examiner.*

EVERETT R. REYNOLDS, *Examiner.*